(12) United States Patent
Kang

(10) Patent No.: US 7,809,208 B2
(45) Date of Patent: Oct. 5, 2010

(54) IMAGE SHARPENING WITH HALO SUPPRESSION

(75) Inventor: Sing Bing Kang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 797 days.

(21) Appl. No.: 11/755,661

(22) Filed: May 30, 2007

(65) Prior Publication Data
US 2008/0298712 A1 Dec. 4, 2008

(51) Int. Cl.
*G06K 9/40* (2006.01)
(52) U.S. Cl. ....................... 382/266; 382/263
(58) Field of Classification Search ................. 382/263, 382/266, 254, 260, 274
See application file for complete search history.

(56) References Cited

U.S. PATENT DOCUMENTS

| | | | |
|---|---|---|---|
| 4,724,395 A | 2/1988 | Freeman | |
| 5,031,227 A | 7/1991 | Raasch et al. | |
| 5,469,239 A | 11/1995 | Ishida et al. | |
| 5,629,734 A | 5/1997 | Hamilton, Jr. | |
| 5,867,285 A | 2/1999 | Hirota et al. | |
| 6,173,085 B1 | 1/2001 | Hamilton, Jr. et al. | |
| 6,195,467 B1 | 2/2001 | Asimopoulos | |
| 6,266,439 B1 | 7/2001 | Pollard et al. | |
| 6,323,959 B1 | 11/2001 | Toyama et al. | |
| 6,327,078 B1 | 12/2001 | Lee | |
| 6,363,220 B1 | 3/2002 | Ide | |
| 6,438,270 B1 | 8/2002 | Harrington | |
| 6,587,224 B1 | 7/2003 | Nabeshima et al. | |
| 6,614,474 B1 | 9/2003 | Malkin et al. | |
| 6,628,329 B1 | 9/2003 | Kelly et al. | |
| 6,697,522 B1 | 2/2004 | Ishikawa | |
| 6,879,735 B1 | 4/2005 | Portniaguine et al. | |
| 6,915,024 B1 | 7/2005 | Maurer | |
| 2004/0036923 A1 | 2/2004 | Kokemohr et al. | |
| 2004/0109614 A1 | 6/2004 | Enomoto et al. | |
| 2004/0247195 A1 | 12/2004 | Chauville et al. | |
| 2006/0093234 A1 | 5/2006 | Silverstein | |
| 2008/0031538 A1* | 2/2008 | Jiang et al. | 382/261 |

(Continued)

FOREIGN PATENT DOCUMENTS

WO  WO-2005089369 A1  9/2005

OTHER PUBLICATIONS

Boult, T. E., G. Wolberg, Correcting chromatic aberrations using image warping, IEEE Comp. Soc. Conf. on Proc. of Comp. Vision and Pattern Recognition, Jun. 15-18, 1992, pp. 684-68, Champaign, IL, USA.

(Continued)

*Primary Examiner*—Yon Couso
(74) *Attorney, Agent, or Firm*—Lyon & Harr, LLP; Richard T. Lyon

(57) ABSTRACT

An image sharpening technique with halo suppression is presented. Generally, one implementation of this technique completely suppresses the haloing effect typically caused by image sharpening by restricting values to within the local minimum and maximum intensities of the unsharpened image. Thus, if the sharpened value is below the local minimum, it is replaced with the local minimum. Similarly, the local maximum is taken if the sharpened value exceeds it. In other implementations of the technique, haloing caused by image sharpening is suppressed but not completely eliminated, thereby producing a subtle haloing effect.

20 Claims, 11 Drawing Sheets

U.S. PATENT DOCUMENTS

2008/0101717 A1* 5/2008 Ho .............................. 382/266

OTHER PUBLICATIONS

Colomb, T., F. Montfort. J. Kúhn, N. Aspert, E. Cuche, A. Marian, F. Charriére, S. Bourquin, P. Marquet, C. Depeursinge, Numerical parametric lens for shifting, magnification, and complete aberration compensation in digital holographic microscopy, J. Optical Soc. of Am. A: Optics Image Science Vision, Dec. 23, 2006 vol. 23, No. 12, pp. 3177-3190.

Evennett, P., The new photomicrography, Proceedings of the Royal Microscopical Society, 2000, pp. 253-256, vol. 35.

Farrar, N. R., A. H. Smith, D. R. Busath, and D. Taitano, In-situ measurement of lens aberrations, Society of Photo-Optical Instrumentation Engineers, 2000, pp. 18-29, vol. 4000, No. 1.

Nayar, S. K., M. Watanabe, and M. Noguchi, Real-time focus range sensor, Int'l Conf. on Comp. Vision, 1995, pp. 995-1001.

Pillman, B. H., Impact of CCD size, pixel pitch, and anti-aliasing filter design on sharpness of digital camera print, PICS 2000: Image Processing, Image Quality, Image Capture, Systems Conf., Mar. 2000, pp. 216-220, Portland, OR, USA.

Willson, R. G., S. A. Shafer, Active lens control for high precision computer imaging, Proc. IEEE Int'l Conf. on Robotics and Automation, (ICRA '91), Apr. 1991, pp. 2063-2070, vol. 3.

Tumblin, J., Turk, G., LCIS: A boundary hierarchy for detail-preserving contrast reduction, ACM SIGGRAPH '99 Conference Proceedings, Annual Conference Series, Aug. 8-13, 1999, pp. 83-90, Los Angeles, California.

Luft, T., C. Colditz, O. Deussen, Image enhancement by unsharp masking the depth buffer, Int'l Conf. on Computer Graphics and Interactive Techniques, 2006, pp. 1206-1213, Boston, Massachusetts.

Dorney, T., S. Bhashyam, A. Doran, H. Choi, P. Flandrnin, and R. Baraniuk, Edge localized image sharpening via reassignment with application to computed tomography, SPIE TEchnical Conf. on Mathematical Modeling, Estimation and Imaging, Jul. 2000, pp. 218-227, vol. 4121, San Diego, CA.

Gilboa, G., N. Sochen, Y. Y. Zeevi, Image sharpening by flows based on triple well potentials, J. of Mathematical Imaging and Vision, 2004, pp. 121-131, vol. 20.

Hayes, M. P. and S. A. Fortune, Recursive phase estimation for image sharpening, Image and Vision Computing New Zealand, Nov. 2005, University of Otago, Dunedin, New Zealand.

Jaspers, E. G. T., and P. H. N. de With, A generic 2D sharpness enhancement algorithm for luminance signals, IEEE Int'l Conf. Image Processing Applications, 1997, pp. 263-273, vol. 1.

Saito, T., H. Harada, J. Satsumabayashi, and T. Komatsu, Color image sharpening based on nonlinear reaction-diffusion, Int'l Conf. Image Processing, 2003, pp. 389-392, vol. 3.

* cited by examiner

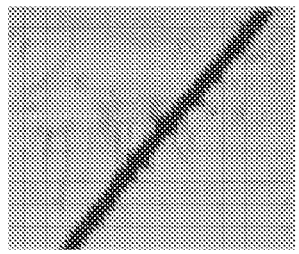 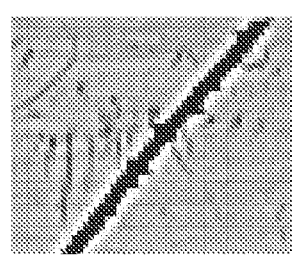 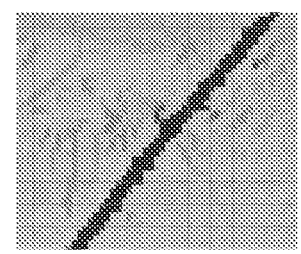
FIG. 4  FIG. 5  FIG. 6
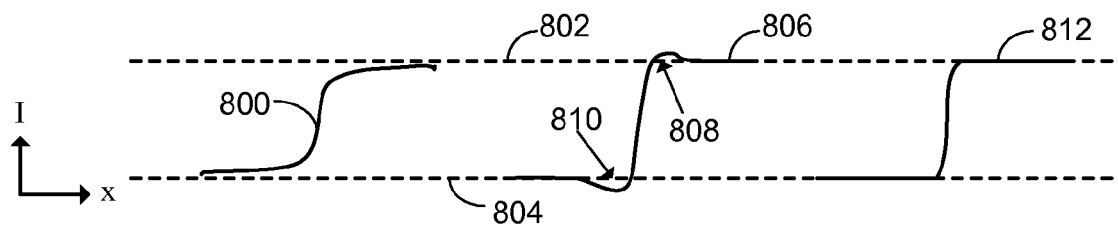
FIG. 8
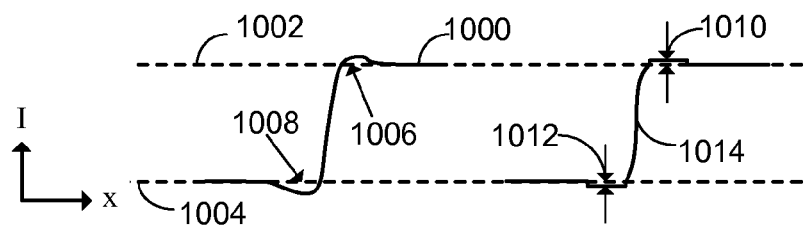
FIG. 10

IMAGE SHARPENING WITH HALO SUPPRESSION

BACKGROUND

Images taken with a digital camera are often blurred due to imperfect focus, camera motion, and in-camera optical and sensor characteristics (e.g., raw to color conversion for single chips). As a result these images are often post-processed to increase sharpness. This accounts for the many commercially available digital image processing software applications that include an image sharpening feature. In addition, many digital cameras now include in-camera sharpening as part of a post-processing stage before the images are output.

Typically, these sharpening operations involve the use of some form of high-pass filter. Unfortunately, one of the major drawbacks associated with sharpening is its tendency to produce a halo effect (which is sometimes called ringing). The halo effect is characterized by bright regions of the image that are adjacent to dark regions becoming brighter than their surrounding pixels. In addition, dark regions of the image that are adjacent to bright regions get darker than their surrounding pixels.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present technique for image sharpening with halo suppression generally involves finding the minimum and maximum intensities within a local window, and truncating the output intensity based on these maximum and minimum values.

In one embodiment of the technique, the intensity value of each pixel in a window surrounding each edge pixel of the image is identified prior to sharpening, as are the maximum and minimum intensity values among the pixels in each window. It is noted that for the purposes of this description, the term edge pixel is defined as those pixels on or within a prescribed distance of (e.g., up to 10 pixels away) an edge depicted in the image. The image is then sharpened, and for each edge pixel of the image after sharpening, it is determined if the sharpened intensity value of the edge pixel under consideration exceeds the maximum intensity value identified in the window associated with that edge pixel. If it does, the intensity value of the edge pixel is set to the window's maximum intensity value. Otherwise, it is determined if the sharpened intensity value of the edge pixel under consideration is less than the minimum intensity value identified in the window associated with that edge pixel. If it is, the intensity value of the edge pixel is set to the window's minimum intensity value. This effectively eliminates haloing in the sharpened image.

In other embodiments of the technique, haloing caused by image sharpening is suppressed but not completely eliminated, thereby producing a subtle haloing effect. Generally, the procedure is the same in these other embodiments, except all the pixels could be considered rather than just the edge pixels. In addition, in one version, instead of setting the intensity value of a pixel whose sharpened intensity value exceeded the maximum intensity value of its associated window to the window's maximum intensity value, it is set to the window's maximum intensity value increased by a prescribed maximum intensity tolerance value. Likewise, instead of setting the intensity value of a pixel whose sharpened intensity value fell below the minimum intensity value of its associated window to the window's minimum intensity value, it is set to the window's minimum intensity value decreased by a prescribed minimum intensity tolerance value. In other versions, the intensity value of a pixel whose sharpened intensity value exceeded the maximum intensity value of its associated window is scaled with or without clipping. Likewise, the intensity value of a pixel whose sharpened intensity value fell below the minimum intensity value of its associated window is scaled with or without clipping.

It is noted that while the foregoing limitations in existing image sharpening schemes described in the Background section can be resolved by a particular implementation of the image sharpening with halo suppression technique according to the present invention, this is in no way limited to implementations that just solve any or all of the noted disadvantages. Rather, the present technique has a much wider application as will become evident from the descriptions to follow. In addition, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 4 is an image showing a blurred image of an object taken by a digital camera as it appears before sharpening.

FIG. 5 is the image of FIG. 4 after being sharpened using a conventional unsharp filtering approach.

FIG. 6 is the image of FIG. 4 after being sharpened using an embodiment of the image sharpening with halo suppression technique without tolerancing according to the present invention.

FIG. 8 is a diagram illustrating idealized results of applying an embodiment of the present image sharpening with halo suppression technique without tolerancing to an edge in an image shown as a series of 1D curves.

FIG. 10 is a diagram illustrating idealized results of applying an embodiment of the present image sharpening with halo suppression technique with tolerancing to an edge in an image shown as a series of 1D curves.

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present sharpening with halo suppression (SHS) technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
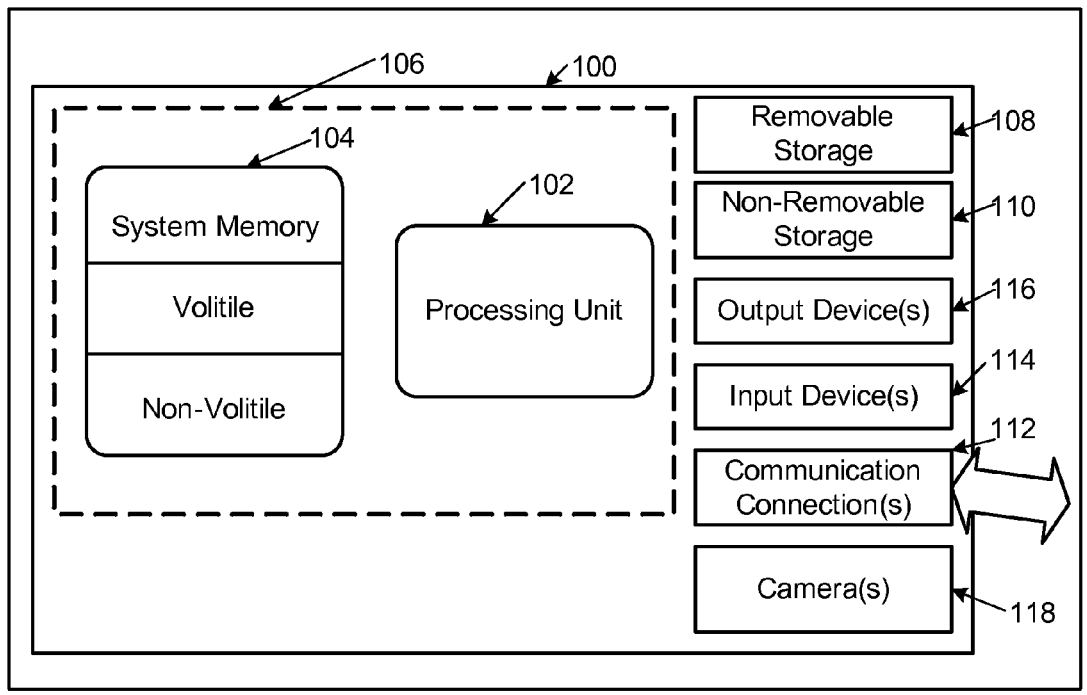
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present SHS technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Of particular note is that device 100 can include a camera 118 (such as a digital/electronic still or video camera), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present SHS technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present SHS technique.

2.0 The Sharpening with Halo Suppression (SHS) Technique

In one embodiment of present SHS technique, the haloing effect caused by image sharpening is completely suppressed by restricting values to within the local minimum and maximum intensities of the unsharpened image. In other embodiments, haloing caused by image sharpening is suppressed but not completely eliminated, thereby producing a subtle haloing effect. This is generally accomplished by restricting intensity values to within the local minimum decreased by a prescribed minimum intensity tolerance value and the local maximum increased by a prescribed maximum intensity tolerance value. Each of these embodiments is described in more detail in the sections to follow, after a brief description of conventional sharpening operations.

2.1 Conventional Sharpening Operations

A conventional sharpening operation involves enhancing the high-frequency components of a signal, which represents an image in this case. There are many sharpening scheme currently in existence, most of which result in the previously-described halo effect. One such sharpening operation is called the unsharp filter. This filter is commonly used in the photographic and printing industries for crispening edges, and will be used as an example to generally describe the sharpening process and the resulting halo effect.

Figure 2:
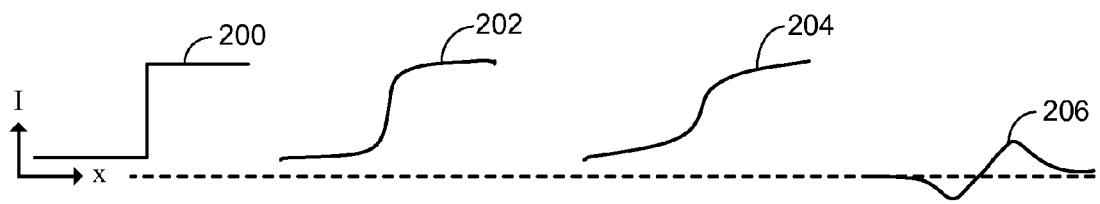
FIG. 2 is a diagram illustrating the first part of the operation of an unsharp filter on an edge in an image shown as a series of 1D curves.
Figure 3:
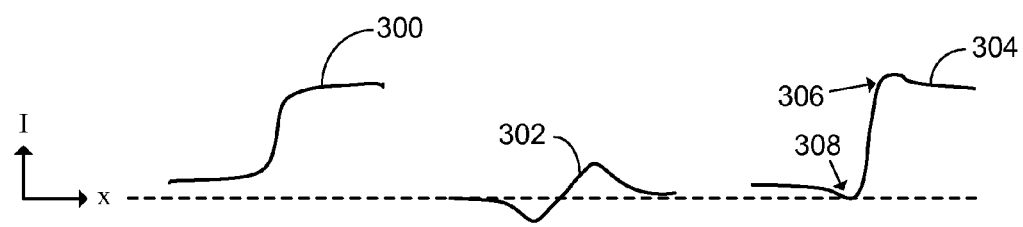
FIG. 3 is a diagram illustrating the second part of the operation of an unsharp filter on an edge in an image shown as a series of 1D curves.

The basic idea of the unsharp filter is shown in FIG. 2. Consider an original observed edge 202 in an image (shown in 1D for illustration purposes), which is blurred due to the aforementioned imperfect focus, camera motion, and in-camera optical and sensor characteristics associated with a digital camera, in comparison to an ideal step edge 200. An approximation of the blurred portion of the edge is extracted using a low-pass filter to produce the curve 204. Taking the difference between the original and blurred versions of the edge, results in the high frequency signal 206. Referring now to FIG. 3, the high frequency signal 302 is added back to the original edge 300 to generate the resulting sharpened edge output 304. Note the overshoot 306 and undershoot 308 regions in the sharpened edge output 304. These regions are the source of the halo effect. It is noted that the foregoing curves are shown as continuous signals for convenience in explaining the halo effect. In reality, sharpening is typically applied on a pixel-by-pixel basis after the image captured by the camera sensor has been sampled to produce a discrete output.

The halo effect is illustrated in FIGS. 4 and 5. Referring to FIG. 4, an original blurred image without sharpening is shown. The blurred image is then sharpened using the unsharp filtering approach described above. The result of this sharpening is shown in FIG. 5. Notice the bright regions adjacent the dark regions are brighter than their surrounding pixels in the sharpened image. In addition, the dark regions adjacent bright regions appear even darker. This is the halo effect.

2.2 The SHS Technique without Tolerancing

The present SHS technique is based on the observation that the aforementioned overshooting is above the local pixel intensity maximum of the original, non-sharpened image, while undershooting is below the local pixel intensity minimum of the original image. Thus, it is possible to suppress the halo effect by performing the sharpening operation as described previously, but clipping the output pixel intensities.

More particularly, in one embodiment of the present technique the sharpened pixel intensities are limited to the minimum and maximum intensities within a local window. In this embodiment, the exact values of the maximum and minimum pixel intensities are used, without any tolerance factor. Generally, this involves first identifying the minimum and maximum intensities within a local window in the original unsharpened image. The image is then sharpened as described previously using any conventional sharpening procedure, except the resulting sharpened pixel intensity that is above the identified local maximum intensity is truncated to this maximum. Likewise, any sharpened pixel intensity that is below the identified local minimum intensity is truncated to the minimum.

It is noted that the haloing effect primarily involves the edges in an image, and does not significantly affect non-edge pixels. In other words, the sharpened pixel intensities of non-edge pixels typically do not exceed the local maximum or fall below the local minimum. Given this, the edge pixels of an image can be identified prior to the image being sharpened. Then, the operations associated with the present SHS technique involving identifying and truncating pixel intensities that exceed the local maximum or fall below the local minimum, would be performed only for the identified edge pixels, rather than applied to each pixel of the image. It is noted that for the purposes of this description, the term edge pixel is defined as those pixels on or within a prescribed distance of (e.g., up to 10 pixels away) an edge depicted in the image.

Figure 7A:
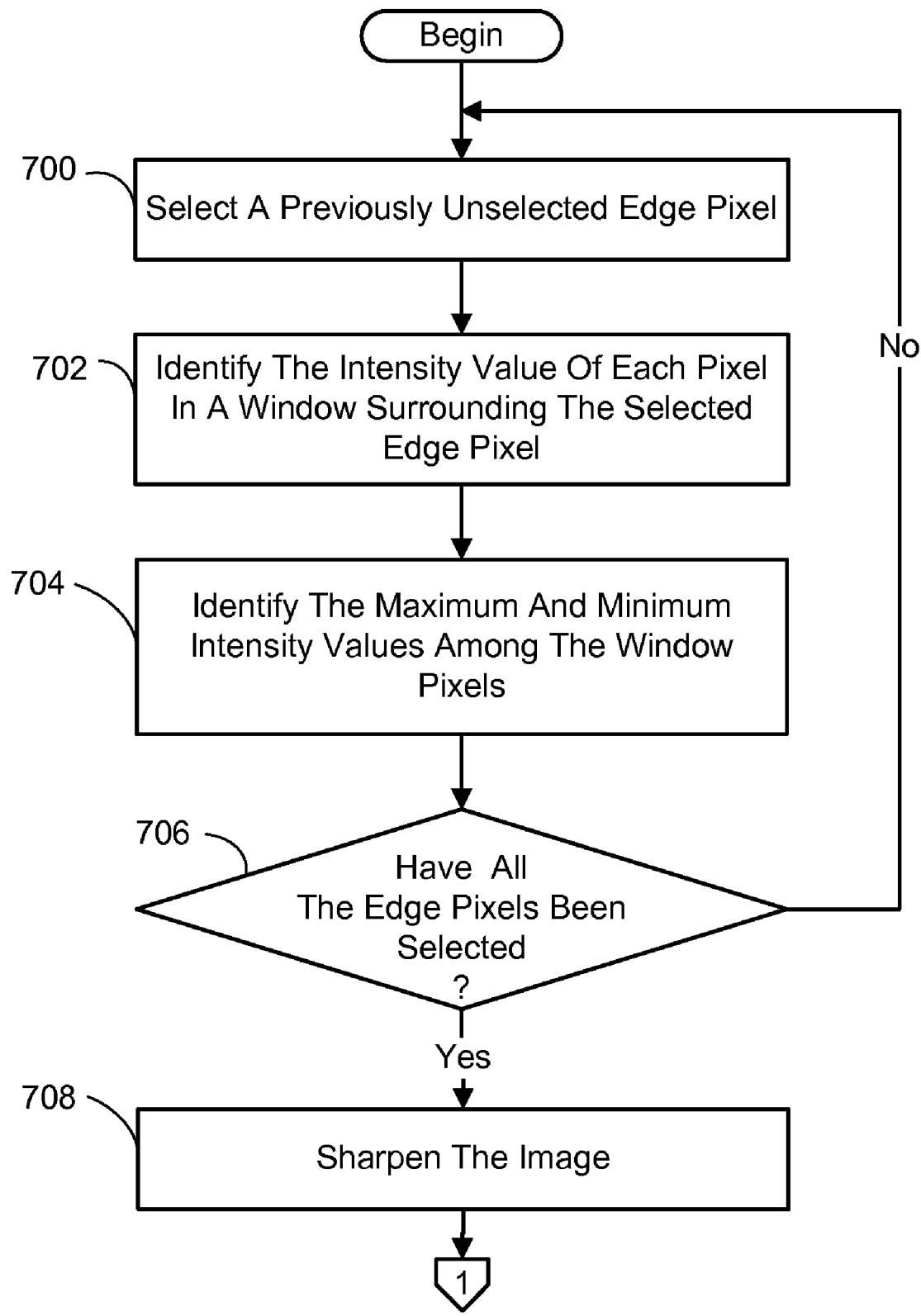
FIGS. 7A-B are a continuing flow diagram generally outlining an embodiment of the image sharpening with halo suppression technique without tolerancing according to the present invention.
Figure 7B:
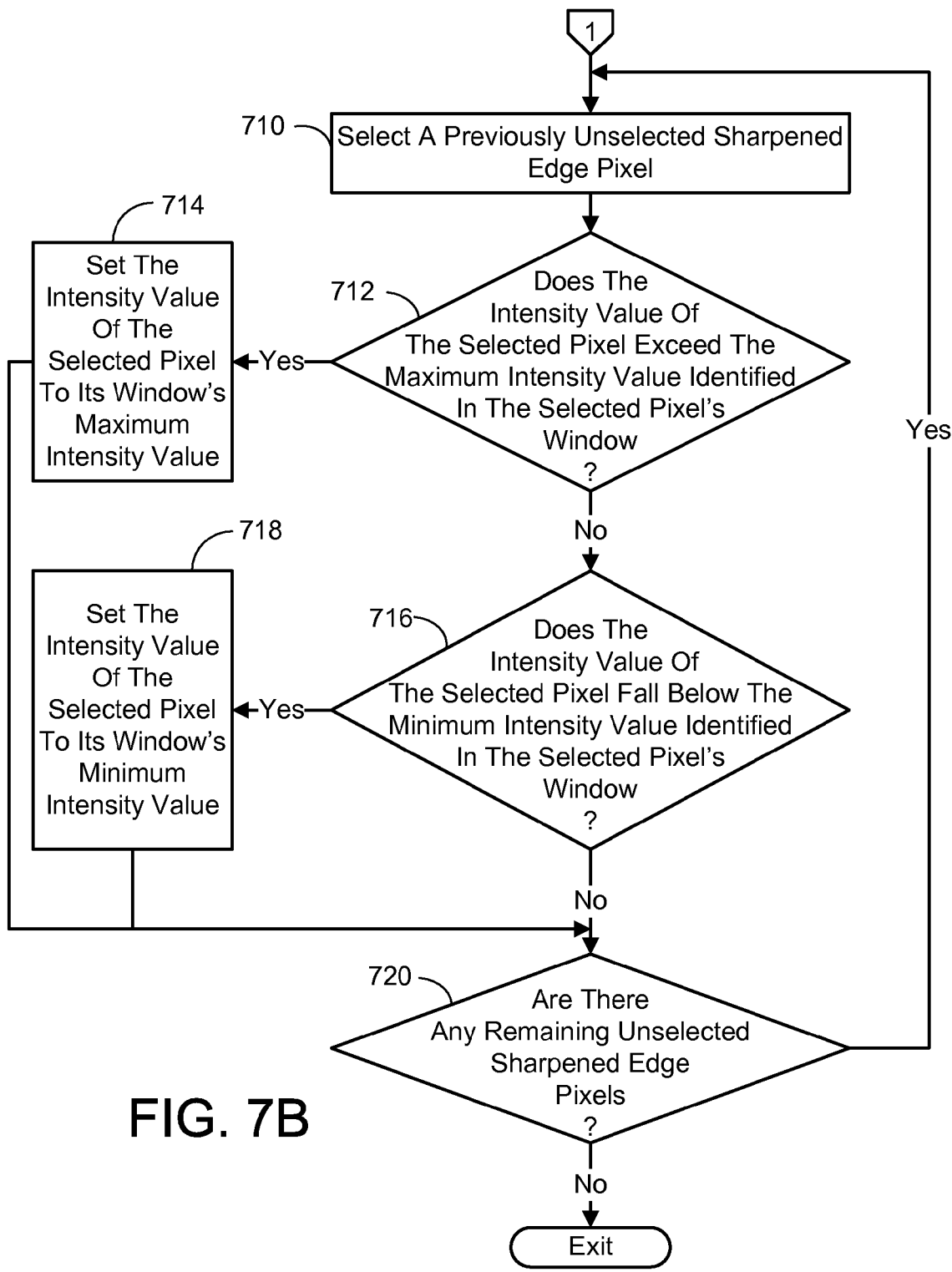

More particularly, referring to FIGS. 7A-B, in one embodiment this involves first selecting a previously unselected edge pixel of the image prior to sharpening (700). The intensity value of each pixel in a prescribed-sized window surrounding the selected edge pixel is identified (702), as are the maximum and minimum intensity values among the window pixels (704). It is then determined if all the edge pixels in the image have been selected (706). If not, actions 700 through 706 are repeated. When all the edge pixels have been selected and processed, the image is sharpened, thereby establishing a sharpened intensity value for each pixel of the image (708). Next, a previously unselected one of the now sharpened edge pixels in the image is selected (710), and it is determined if the intensity value of the selected pixel exceeds the maximum intensity value identified in the window associated with the selected pixel (712). If so, the intensity value of the selected pixel is truncated to match that maximum intensity value (714) and the procedure skips to action 720. Otherwise, it is determined if the intensity value of the selected pixel falls below the minimum intensity value identified in the window associated with the selected pixel (716). If so, the intensity value of the selected pixel is truncated to match that minimum intensity value (718). It is then determined if there are any remaining sharpened edge pixels that have not been selected and processed (720). If there are unselected pixels remaining, actions 710 through 720 are repeated. When all the sharpened edge pixels have been considered, the process ends. It is noted that actions 716 and 718 could be performed before actions 712 and 714, if desired. In other words, the minimum side is considered before the maximum side.

The foregoing truncating operation is illustrated in FIG. 8. Consider an original observed edge 800 in an image (shown in 1D for illustration purposes). The upper extent of the edge intensity is marked by the dashed line 802, and the lower extent of the edge intensity is marked by the dashed line 804. A sharpened form of the edge 806 produced using a conventional image sharpening technique is shown to the right of the original edge 800. Notice that a portion 808 of the conventionally sharpened edge 806 has intensities that exceed the local maximum 802 of the original edge 800. There is also a portion 810 of the conventionally sharpened edge 806 having intensities that drop below the local minimum 804 of the original edge 800. In accordance with the present technique these portions 808, 810 are respectively truncated to the local maximum and minimum intensity values. This results in the truncated sharpened edge 812 shown on the far right in FIG. 8.

An image exhibiting the sharpened and truncated pixel intensities, which was sharpened according to the present SHS technique, is shown in FIG. 6. Referring to FIGS. 4 through 6, compared to the original blurred image of FIG. 4, the image of FIG. 6 exhibits a sharper, crisper look. In addition, compared to the conventionally sharpened image of FIG. 5, the image of FIG. 6 lacks the unnatural-looking halo effect. Thus, the desired sharpening is achieved without the halo effect using the present technique.

2.3 The SHS Technique with Tolerancing

It is noted that while the haloing effect caused by conventional image sharpening methods appears unnatural and is undesirable, a slight amount of haloing might be appealing as it would subtly accentuate the edges in an image. This subtle haloing effect can be achieved with the present SHS technique by suppressing some, but not all of the ringing caused by the image sharpening.

Thus, in another embodiment of the present SHS technique, the sharpened pixel intensities are limited to the minimum intensity within the local window reduced by a small tolerance value, and to the maximum intensity within the local window increased by a small tolerance value.

The tolerance value associated with the minimum intensity can be the same as the tolerance value associated with the maximum intensity, or it could be different, depending on the haloing effect desired. Generally, the tolerance value associated with the maximum intensity will control the degree to which bright regions of the image that are adjacent to dark regions will brighten in comparison to their surrounding pixels. In addition, the tolerance value associated with the minimum intensity will control the degree to which dark regions of the image that are adjacent to bright regions darken in comparison to their surrounding pixels.

The magnitude of the minimum and maximum intensity tolerance values is set so as to produce the desired amount of haloing. Ideally, the tolerance values are set so that the edges in the image are accentuated just enough to appear pleasing, and not to the extent that they begin to appear unnatural. The exact tolerance values that achieve this desired effect can vary from image-to-image, and even from window-to-window in the same image. However, generally, the tolerance values should range between about 5 and about 20.

Figure 9A:
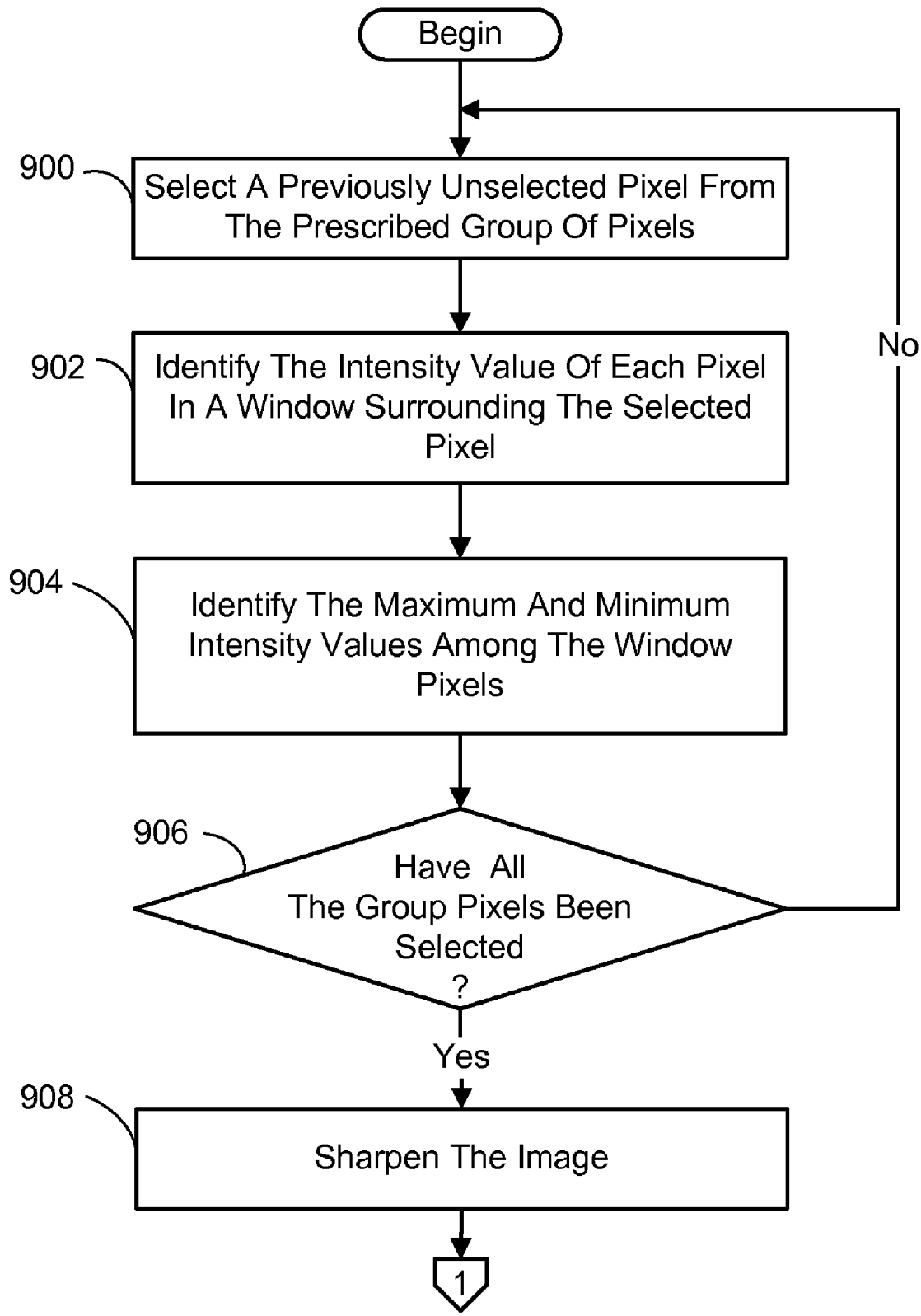
FIGS. 9A-B are a continuing flow diagram generally outlining an embodiment of the image sharpening with halo suppression technique with tolerancing according to the present invention.
Figure 9B:
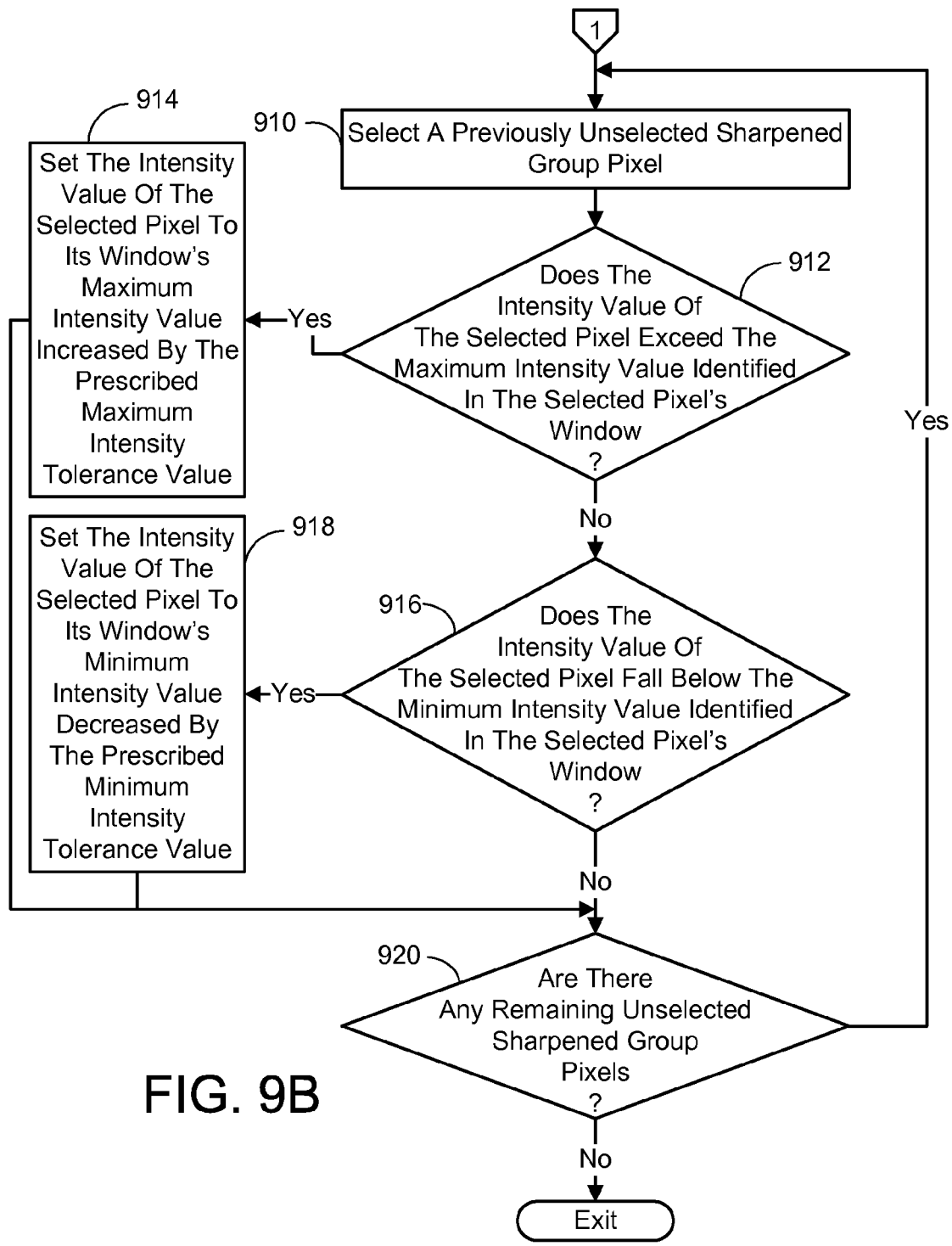

Referring to FIGS. 9A-B, one implementation of the foregoing embodiment of the present SHS technique employing maximum and minimum intensity tolerance values is described. First, a previously unselected pixel of the image is selected from a prescribed group of pixels, prior to sharpening (900). The group of pixels could be all the image pixels, or for the reasons described previously, just the edge pixels. The intensity value of each pixel in a prescribed-sized window surrounding the selected pixel is identified (902), as are the maximum and minimum intensity values among the window pixels (904). It is then determined if all the pixels in the prescribed group have been selected (906). If not, actions 900 through 906 are repeated. When all the pixels in the prescribed group have been selected and processed, the image is sharpened, thereby establishing a sharpened intensity value for each pixel of the image (908). Next, a previously unselected one of the now sharpened pixels in the prescribed group is selected (910), and it is determined if the intensity value of the selected pixel exceeds the maximum intensity value identified in the window associated with the selected pixel (912). If so, the intensity value of the selected pixel is truncated to match that maximum intensity value increased by a prescribed maximum intensity tolerance value (914), and the procedure skips to action 920. Otherwise, it is determined if the intensity value of the selected pixel falls below the minimum intensity value identified in the window associated with the selected pixel (916). If so, the intensity value of the selected pixel is truncated to match that minimum intensity value decreased by a prescribed minimum intensity tolerance value (918). It is then determined if there are any remaining sharpened pixels in the prescribed group that have not been selected and processed (920). If there are unselected pixels remaining, actions 910 through 920 are repeated. When all the sharpened pixels in the prescribed group have been considered, the process ends. It is noted that actions 916 and 918 could be performed before actions 912 and 914, if desired.

This version of the truncating operation using the tolerance values is illustrated in FIG. 10. A sharpened form of the edge 1000 produced using a conventional image sharpening technique is shown on the left. The upper extent of the original edge intensity prior to sharpening is marked by the dashed line 1002, and the lower extent of the original edge intensity prior to sharpening is marked by the dashed line 1004. A portion 1006 of the conventionally sharpened edge 1000 has intensities that exceed the local maximum 1002. There is also a portion 1008 of the conventionally sharpened edge 1000 that has intensities that drop below the local minimum 1004. In accordance with the embodiment of the present technique using the tolerance values, these portions 1006, 1008 are respectively truncated to the local maximum plus the associated tolerance value 1010 and to the local minimum less the associated tolerance value 1012. This results in the truncated sharpened edge 1014 shown on the right in FIG. 10.

2.4 The SHS Technique with Scaling

Notice in FIG. 10 that the foregoing implementation of the present SHS technique results in an abrupt jump in intensity for pixels that either exceeded the local maximum intensity, or fell below the local minimum intensity. In a variation of the present SHS technique employing scaling, this abrupt intensity jump is avoided. The scaling variation generally involves limiting the sharpened pixel intensities that are less than the minimum intensity within a local window to a value that is less than that minimum intensity, but more than the sharpened pixel intensity itself. In addition, the sharpened pixel intensities that are found to be greater than the maximum intensity within a local window are limited to a value that is more than that maximum intensity, but less than the sharpened pixel intensity itself.

2.4.1 Straight Scaling

In a first version of the SHS technique with scaling, a straight scaling scheme is employed. Generally, in the straight scaling scheme the portion of the intensity of each sharpened pixel value found to exceed the local maximum (referred to as the excess intensity) or fall below the local minimum (referred to as the intensity deficit) is scaled down and then added back into the local maximum or subtracted from the local minimum, respectively, to suppress but not eliminate the halo effect. Mathematically, the straight scaling scheme can be described as follows. Assume a local maximum pixel value "$I_{max}$" for a pixel whose intensity value "I" exceeds this maximum. Given this, the new intensity value $I_{new1}$ for the pixel in question would be, $$I_{new1} = I_{max} + \lambda_{max}(I - I_{max})$$

where $\lambda_{max}$ is a scaling factor ranging between 0 and 1. The scaling factor $\lambda_{max}$ determines the degree to which bright regions of the image that are adjacent to dark regions will brighten in comparison to their surrounding pixels (i.e., the amount of the lightening halo effect). A scaling factor near 1 leaves most of the lightening halo effect, whereas a factor near 0 removes most of the effect. Similarly, assume a local minimum pixel value "$I_{min}$" for a pixel whose intensity value "I" falls below this minimum. Given this, the new intensity value $I_{new2}$ for the pixel in question would be, $$I_{new2}=I_{min'}-\lambda_{min}(I_{min'}-I)$$

where $\lambda_{min}$ is a scaling factor ranging between 0 and 1. The scaling factor $\lambda_{min}$ determines the degree to which dark regions of the image that are adjacent to bright regions darken in comparison to their surrounding pixels (i.e., the amount of the darkening halo effect). A scaling factor near 1 leaves most of the darkening halo effect, whereas a factor near 0 removes most of the effect. As with the previously described tolerancing scheme, the scaling factor associated with the maximum intensity can be the same as the scaling factor associated with the minimum intensity, or it could be different, depending on the overall halo effect desired.

Figure 11A:
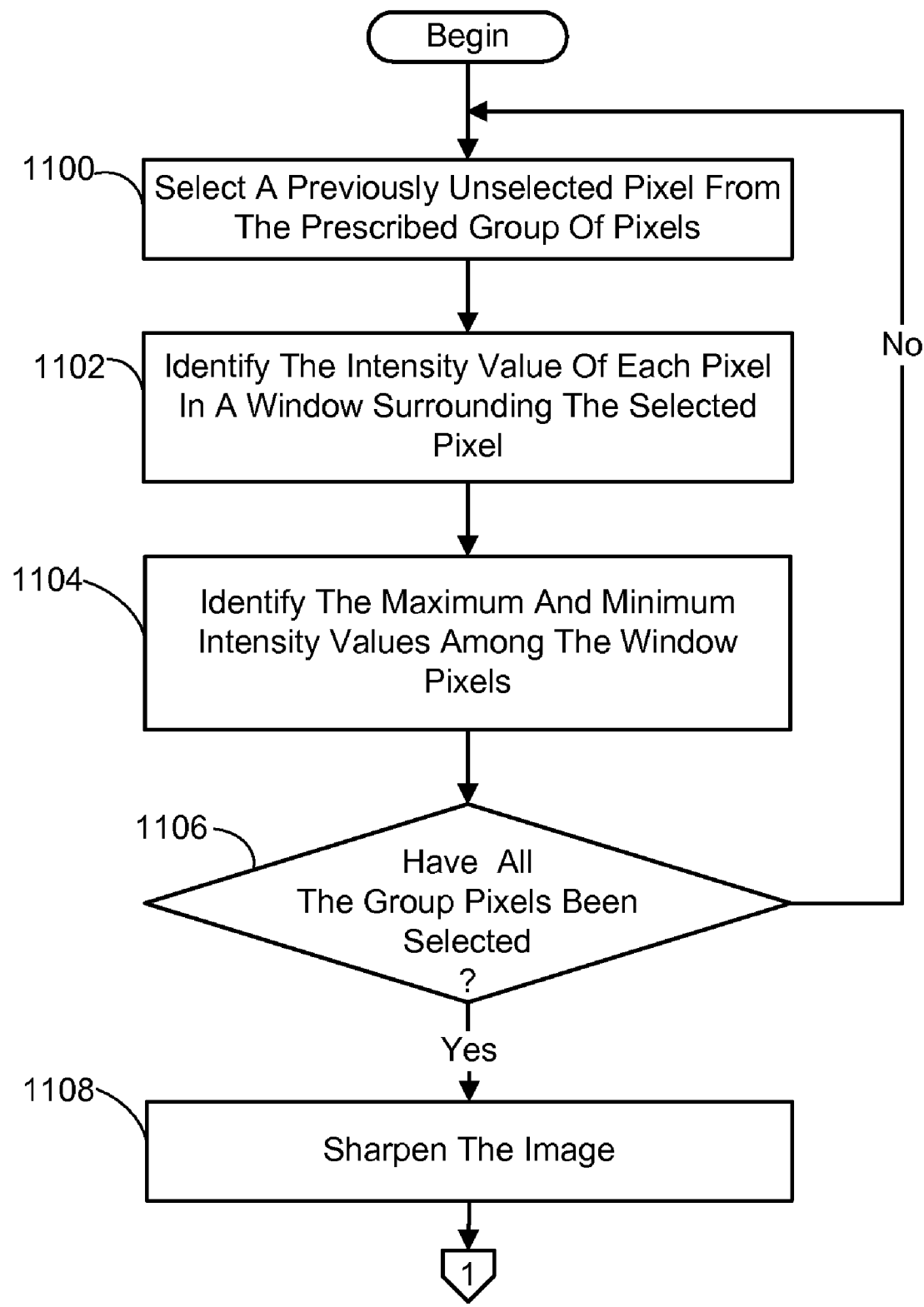
FIGS. 11A-B are a continuing flow diagram generally outlining an alternate embodiment of the image sharpening with halo suppression technique with straight scaling of the excess intensity (in excess of the maximum) or deficit intensity (amount below the minimum) according to the present invention.
Figure 11B:
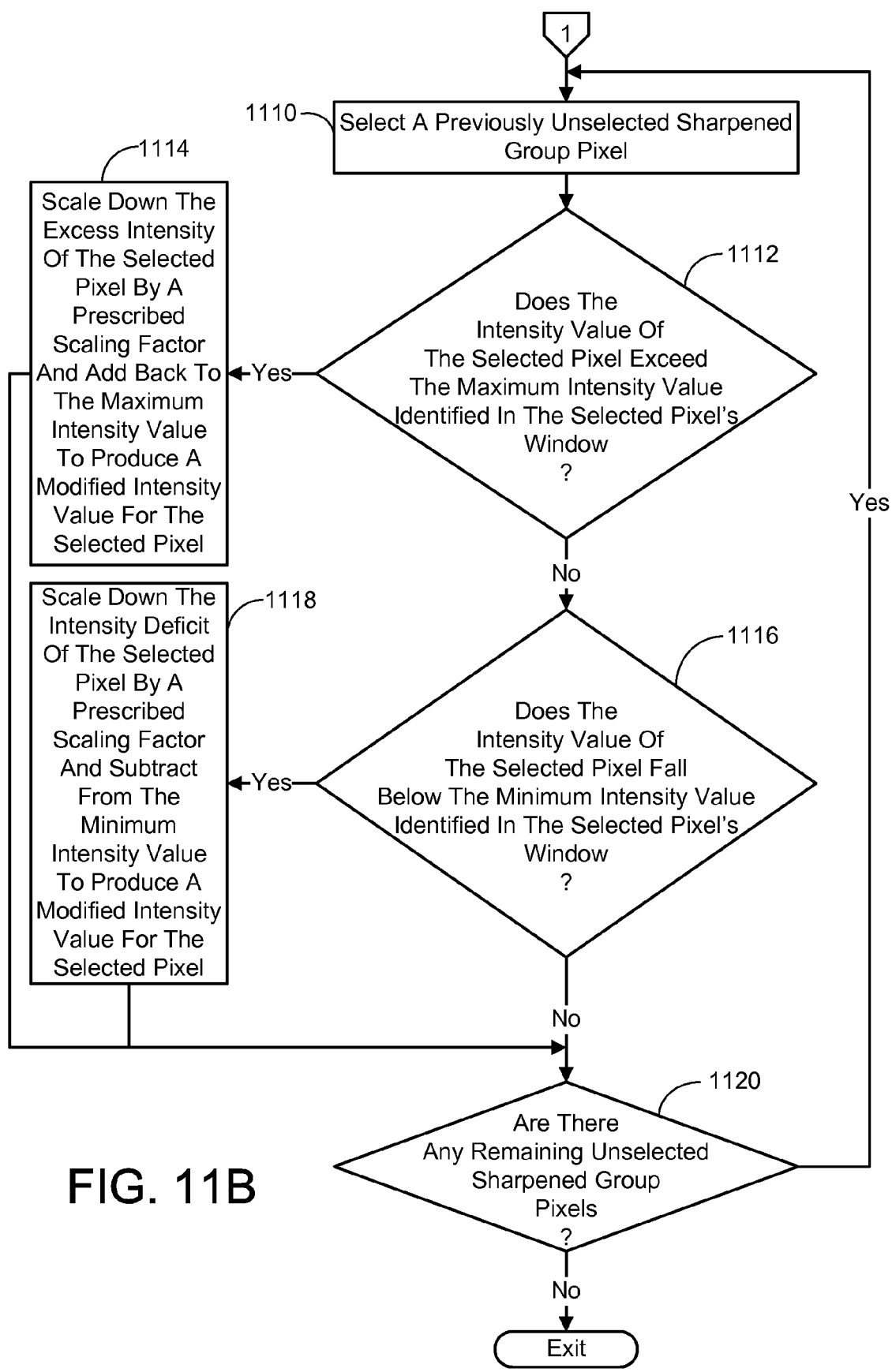

One way of accomplishing the foregoing straight scaling scheme is shown in FIGS. 11A-B. A previously unselected pixel of the image is first selected from a prescribed group of pixels, prior to sharpening (1100). Here again, the group of pixels could be all the image pixels, or just the edge pixels. The intensity value of each pixel in a prescribed-sized window surrounding the selected pixel is identified (1102), as are the maximum and minimum intensity values among the window pixels (1104). It is then determined if all the pixels in the prescribed group have been selected (1106). If not, actions 1100 through 1106 are repeated. When all the pixels in the prescribed group have been selected and processed, the image is sharpened, thereby establishing a sharpened intensity value for each pixel of the image (1108). Next, a previously unselected one of the now sharpened pixels in the prescribed group is selected (1110), and it is determined if the intensity value of the selected pixel exceeds the maximum intensity value identified in the window associated with the selected pixel (1112). If so, the excess intensity of the selected pixel is scaled down by a prescribed scaling factor and added back to the maximum intensity value to produce a modified intensity value for the selected pixel (1114), as described previously, and the procedure skips to action 1120. Otherwise, it is determined if the intensity value of the selected pixel falls below the minimum intensity value identified in the window associated with the selected pixel (1116). If so, the intensity deficit of the selected pixel is scaled down by a prescribed scaling factor and then the result is subtracted from the minimum intensity value to produce a modified intensity value for the selected pixel (1118), as described previously. It is then determined if there are any remaining sharpened pixels in the prescribed group that have not been selected and processed (1120). If there are unselected pixels remaining, actions 1110 through 1120 are repeated. When all the sharpened pixels in the prescribed group have been considered, the process ends. It is noted that actions 1116 and 1118 can be performed before actions 1112 and 1114, if desired.

Figure 12:
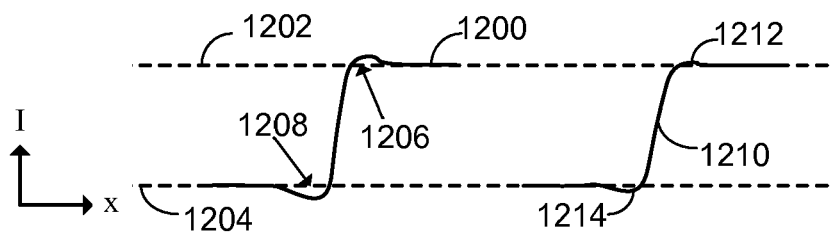
FIG. 12 is a diagram illustrating idealized results of applying an alternate embodiment of the present image sharpening with halo suppression technique with straight scaling of the excess intensity (in excess of the maximum) or deficit intensity (amount below the minimum) to an edge in an image shown as a series of 1D curves.

FIG. 12 illustrates the effect of the procedure outlined in FIGS. 11A-B. A sharpened form of an edge 1200 produced using a conventional image sharpening technique is shown on the left. The upper extent of the original edge intensity prior to sharpening is marked by the dashed line 1202, and the lower extent of the original edge intensity prior to sharpening is marked by the dashed line 1204. A portion 1206 of the conventionally sharpened edge 1200 has intensities that exceed the local maximum 1202. There is also a portion 1208 of the conventionally sharpened edge 1200 that has intensities that drop below the local minimum 1204. Application of the foregoing straight scaling procedure results in the sharpened edge 1210 shown on the right in FIG. 12. As can be seen the abrupt shift in intensity values is avoided. Instead there is a smooth downscaling 1212 or upscaling 1214 of the intensity values that follows the contour of the original sharpened edge.

2.4.2 Scaling with Clipping

In another version of the SHS technique with scaling, a scaling scheme with clipping is employed. Generally, in this scaling scheme the portion of the intensity of each sharpened pixel value found to exceed the local maximum (excess intensity) or fall below the local minimum (intensity deficit) is scaled down and then added back into the local maximum or subtracted from the local minimum, respectively, unless it exceeds a clipping threshold. More particularly, the excess intensity of sharpened pixel values found to exceed the local maximum, but not a maximum clipping threshold value, is scaled and added to the local maximum as described previously. The intensity deficit of sharpened pixel values found to fall below the local minimum, but not a minimum clipping threshold value, is scaled and subtracted from the local minimum as described previously. However, it is also determined if the now modified sharpened pixel values exceed the maximum clipping threshold value. If so, they are truncated to the maximum clipping threshold value. Likewise, it is determined if the modified sharpened pixel values are less than the minimum clipping threshold value. If so, they are truncated to the minimum clipping threshold value. The maximum clipping threshold value can be set at between 5 and 20 points above the local maximum pixel intensity value, and the minimum clipping threshold value can be set at between 5 and 20 points below the local minimum pixel intensity value.

Figure 13C:
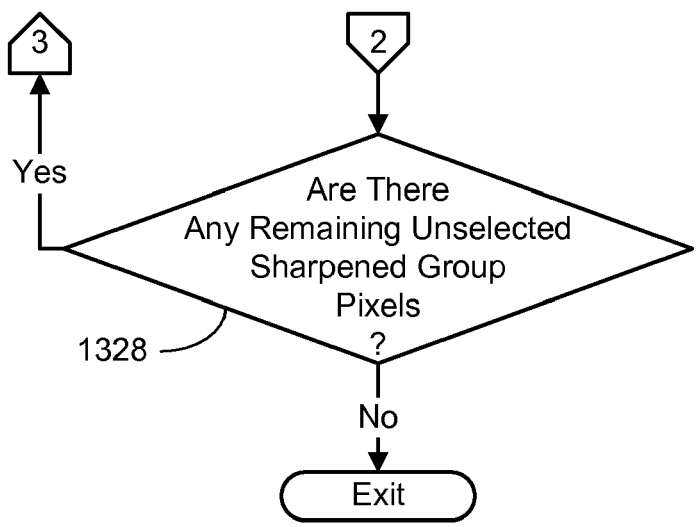
FIGS. 13A-C are a continuing flow diagram generally outlining an alternate embodiment of the image sharpening with halo suppression technique having scaling of excess or deficit with clipping according to the present invention.
Figure 13A:
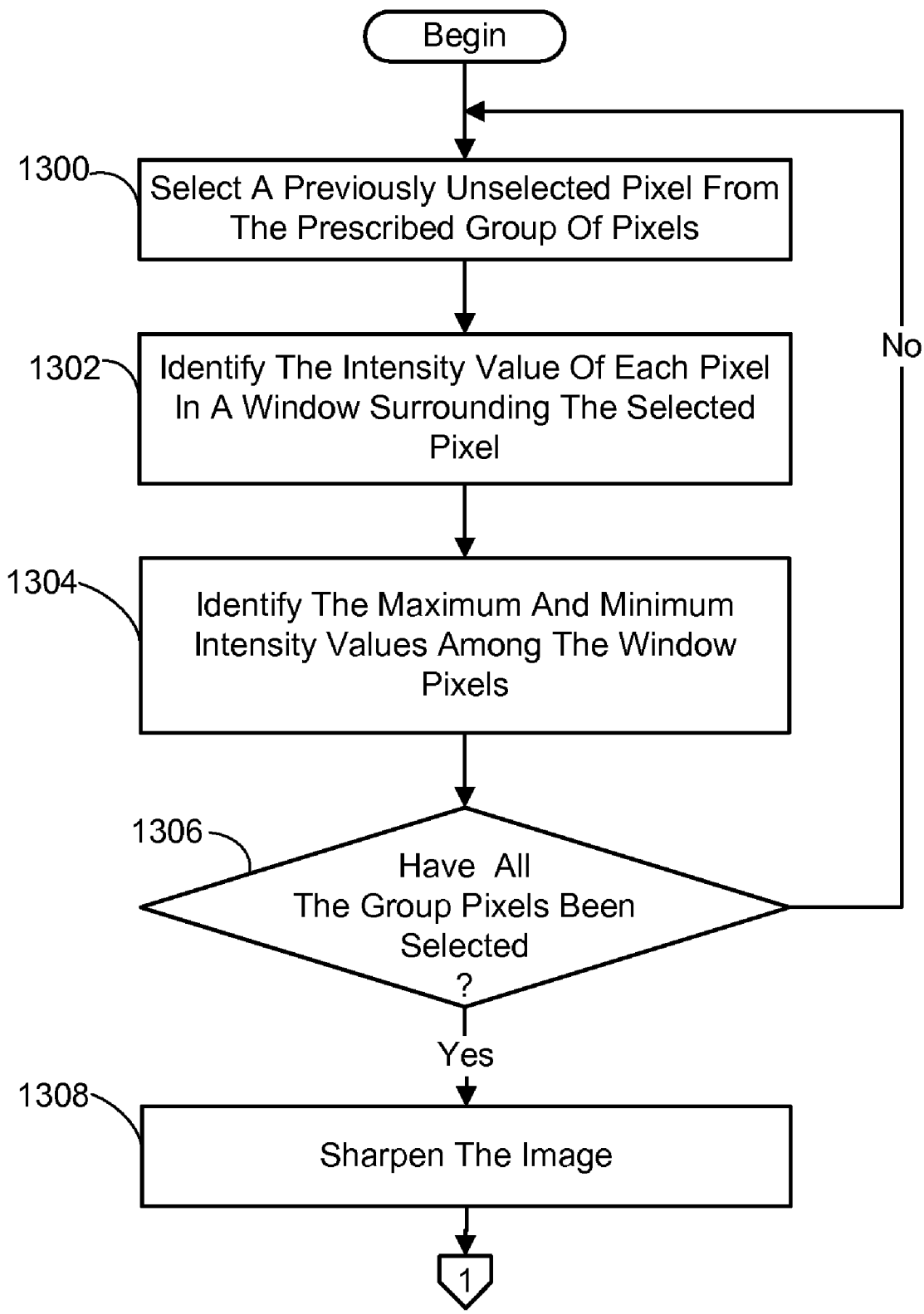
Figure 13B:
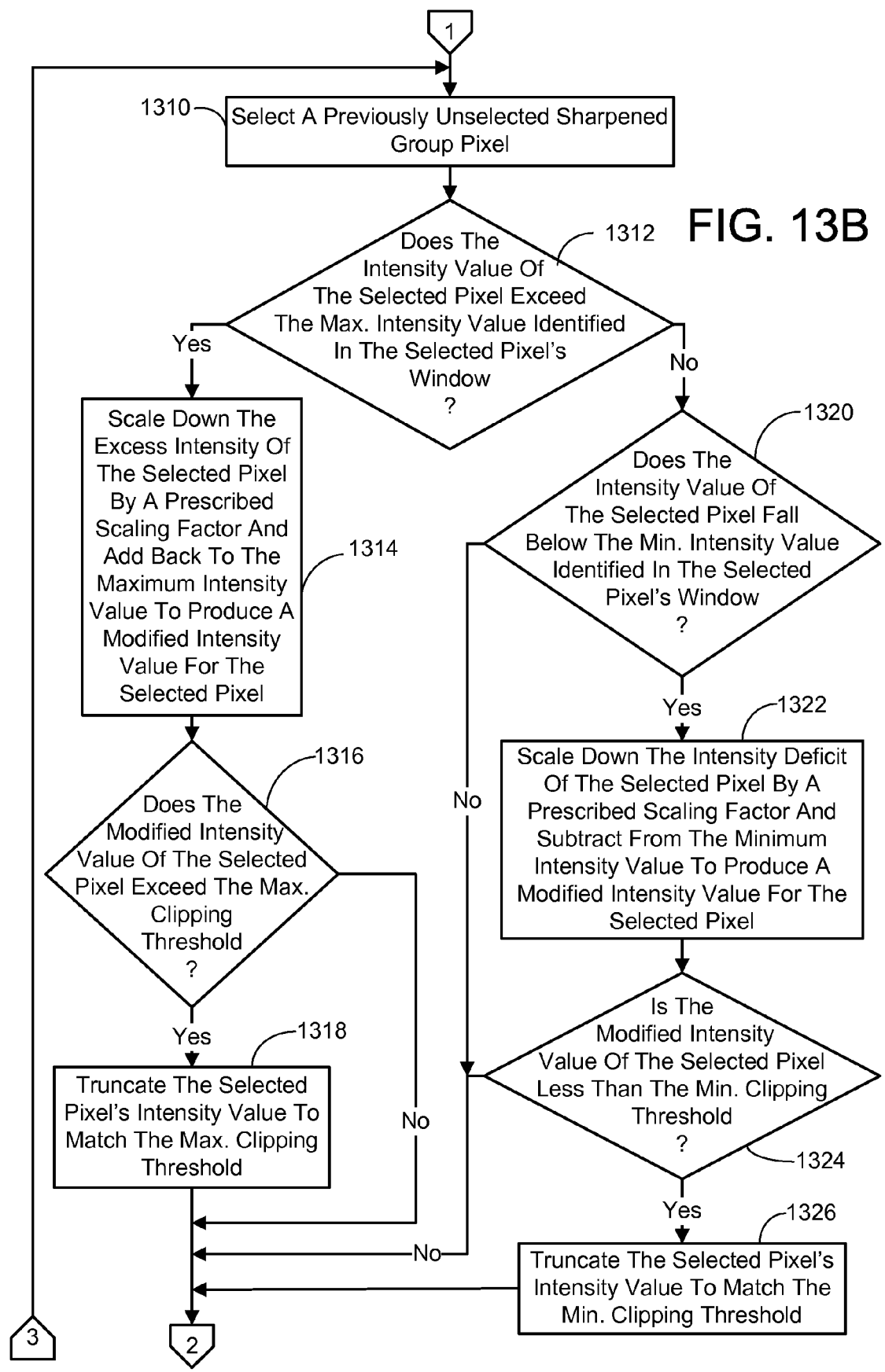

One way of accomplishing the scaling scheme with clipping is shown in FIGS. 13A-C. A previously unselected pixel of the image is first selected from a prescribed group of pixels, prior to sharpening (1300). Once again, the group of pixels could be all the image pixels, or just the edge pixels. The intensity value of each pixel in a prescribed-sized window surrounding the selected pixel is identified (1302), as are the maximum and minimum intensity values among the window pixels (1304). It is then determined if all the pixels in the prescribed group have been selected (1306). If not, actions 1300 through 1306 are repeated. When all the pixels in the prescribed group have been selected and processed, the image is sharpened, thereby establishing a sharpened intensity value for each pixel of the image (1308). Next, a previously unselected one of the now sharpened pixels in the prescribed group is selected (1310), and it is determined if the intensity value of the selected pixel exceeds the maximum intensity value identified in the window associated with the selected pixel (1312). If so, the excess intensity of the selected pixel is scaled down by a prescribed scaling factor and added back to the maximum intensity value, as described previously, to produce a modified intensity value for the selected pixel (1314). It is then determined if the now modified intensity value of the selected pixel exceeds the maximum clipping threshold value (1316). If not, the procedure skips to action 1328. If it does exceed the maximum clipping threshold value, the selected pixel's intensity value is truncated to match the maximum clipping threshold value (1318), and the procedure skips to action 1328. However, if it is determined in action 1312 that the intensity value of the selected pixel does not exceed the maximum intensity value, then it is determined if the intensity value of the selected pixel falls below the minimum intensity value identified in the window associated with the selected pixel (1320). If not, the procedure skips to action 1328. If so, the intensity deficit of the selected pixel is scaled down by a prescribed scaling factor and the result is subtracted from the minimum intensity value to produce a modified intensity value for the selected pixel (1322), as described previously. It is then determined if the now modified intensity value of the selected pixel is less than the minimum clipping threshold value (1324). If not, the procedure skips to action 1328. If it is less than the minimum clipping threshold value, the selected pixel's intensity value is truncated to match the minimum clipping threshold value (1326). It is then determined if there are any remaining sharpened pixels in the prescribed group that have not been selected and processed (1328). If there are unselected pixels remaining, actions 1310 through 1328 are repeated. When all the sharpened pixels in the prescribed group have been considered, the process ends. It is noted that the action groups 1312/1314/1316/1318 and 1320/1322/1324/1326 can be switched in the order they are performed. In other words the minimum side is handled first, before addressing the maximum side.

Figure 14:
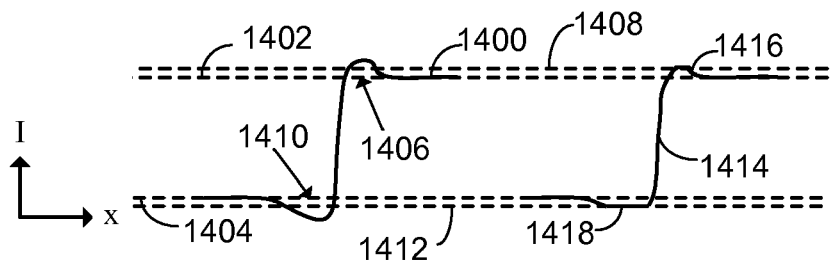
FIG. 14 is a diagram illustrating idealized results of applying an alternate embodiment of the present image sharpening with halo suppression technique having scaling of excess or deficit with clipping to an edge in an image shown as a series of 1D curves.

FIG. 14 illustrates the effect of the procedure outlined in FIGS. 13A-C. A sharpened form of an edge 1400 produced using a conventional image sharpening technique is shown on the left. The upper extent of the original edge intensity prior to sharpening is marked by the dashed line 1402, and the lower extent of the original edge intensity prior to sharpening is marked by the dashed line 1404. A portion 1406 of the conventionally sharpened edge 1400 has intensities that exceed the local maximum 1402, and some of these have intensities that exceed the maximum clipping threshold which is shown by the dashed line 1408. There is also a portion 1410 of the conventionally sharpened edge 1400 that has intensities that drop below the local minimum 1404, and some of these have intensities that are less than the minimum clipping threshold which is shown by the dashed line 1412. Application of the foregoing scaling with clipping procedure results in the sharpened edge 1414 shown on the right in FIG. 14. As can be seen there is a smooth downscaling 1416 or upscaling 1418 of the intensity values that follows the contour of the original sharpened edge until being clipped at the maximum or minimum clipping threshold, respectively.

2.5 Computing the Local Minimum and Maximum Pixel Intensities

In regard to computing the local minimum and maximum pixel intensities for use in the present technique, in tested embodiments, a prescribed sized window was employed such that for each pixel being sharpened, the local maximum and minimum pixel intensities where established using the pixels found within the prescribed sized window centered on the pixel. It was found that a 5×5 window produced satisfactory results, although other window sizes could be employed as desired without exceeding the scope of the present technique. Generally, the window size could vary between 3×3 and 9×9, depending on the image resolution. In addition, while a prescribed-size window approach was employed in tested embodiments; other adaptive windowing techniques could be used instead. For example, a local intensity slope approach could be used to identify the local maximum and minimum intensity values for each pixel being sharpened.

3.0 Other Embodiments

In the foregoing description of embodiments for the present SHS technique, the pixel intensity was referred to as if it was a single entity. This is true in the case of gray scale images. However, in color images, each pixel intensity is actually a combination of individual color intensities. For example, when a Red-Green-Blue (RGB) color model is used to characterize the pixel color, there is a red color channel intensity, green color channel intensity and blue color channel intensity. In view of this, when a color image is being sharpened, the present SHS technique involves repeating the foregoing sharpening and truncation operations for each color channel. It is further noted that this repetition of the operations per color channel also applies to other color models and color space characterizations of the pixel intensities.

Finally, it should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for suppressing a halo effect caused by sharpening an image captured with a digital camera, comprising using a computer to perform the following process actions:

for each edge pixel of the image prior to sharpening,
identifying the intensity value of each pixel in a prescribed-sized window surrounding the edge pixel under consideration, and
identifying the maximum and minimum intensity values among the pixels in said window;
sharpening the image to establish a sharpened intensity value for each pixel of the image; and
for each edge pixel of the image after sharpening,
determining if the sharpened intensity value of the edge pixel under consideration exceeds the maximum intensity value identified in the window associated with that edge pixel,
determining if the sharpened intensity value of the edge pixel under consideration is less than the minimum intensity value identified in the window associated with that edge pixel,
whenever the sharpened intensity value of the edge pixel under consideration exceeds the maximum intensity value identified in the window associated with that edge pixel, setting the intensity value of the edge pixel under consideration to match the maximum intensity value identified in the window associated with the edge pixel, and
whenever the sharpened intensity value of the edge pixel under consideration is less than the minimum intensity value identified in the window associated with that edge pixel, setting the intensity value of the edge pixel under consideration to match the minimum intensity value identified in the window associated with the edge pixel.

2. The process of claim 1, wherein the image is a color image and the intensity value of each pixel comprises a combination of the individual intensity of each of a group of color channels, and wherein all the process actions are performed separately on each color channel.

3. The process of claim 1, wherein the size of the prescribed-sized window ranges from about 3×3 pixels to about 9×9 pixels.

4. The process of claim 3, wherein the size of the prescribed-sized window is 5×5 pixels.

5. A computer-implemented process for suppressing a halo effect caused by sharpening an image captured with a digital camera, comprising using a computer to perform the following process actions:

for each pixel of the image in a prescribed group of pixels prior to sharpening, identifying the intensity value of each pixel in a prescribed-sized window surrounding the pixel under consideration, and identifying the maximum and minimum intensity values among the pixels in said window;

sharpening the image to establish a current sharpened intensity value for each pixel of the image; and for each pixel of the image in the prescribed group of pixels after sharpening, performing the following actions in any order desired, determining if the current sharpened intensity value of the pixel under consideration exceeds the maximum intensity value identified in the window associated with that pixel, and if so, setting the intensity value of the pixel under consideration to an new value equal to the maximum intensity value identified in the window associated with the pixel increased by a prescribed maximum intensity tolerance value and then considering a different previously unconsidered pixel, determining if the current sharpened intensity value of the pixel under consideration is less than the minimum intensity value identified in the window associated with that pixel, and if so, setting the intensity value of the pixel under consideration to a new value equal to the minimum intensity value identified in the window associated with the pixel decreased by a prescribed minimum intensity tolerance value, and then considering a different previously unconsidered pixel.

6. The process of claim 5, wherein the prescribed group of pixels comprises all the pixel of the image.

7. The process of claim 5, wherein the prescribed group of pixels comprises just the edge pixels of the image.

8. The process of claim 5, wherein the image is a color image and the intensity value of each pixel comprises a combination of the individual intensity of each of a group of color channels, and wherein all the process actions are performed separately on each color channel.

9. The process of claim 5, wherein the size of the prescribed-sized window ranges from about 3×3 pixels to about 9×9 pixels.

10. The process of claim 5, wherein the prescribed maximum intensity tolerance value is the same as the prescribed minimum intensity tolerance value for every window.

11. The process of claim 5, wherein the prescribed maximum intensity tolerance value is different from the prescribed minimum intensity tolerance value for at least one window.

12. The process of claim 5, wherein the prescribed maximum intensity tolerance value ranges between about 5 and about 20, and the prescribed minimum intensity tolerance value ranges between about 5 and about 20.

13. A computer-implemented process for suppressing a halo effect caused by sharpening an image captured with a digital camera, comprising using a computer to perform the following process actions:

for each pixel of the image in a prescribed group of pixels prior to sharpening, identifying the intensity value of each pixel in a prescribed-sized window surrounding the pixel under consideration, and identifying the maximum and minimum intensity values among the pixels in said window;

sharpening the image to establish a sharpened intensity value for each pixel of the image; and for each pixel of the image in the prescribed group of pixels after sharpening, determining if the sharpened intensity value of the pixel under consideration exceeds the maximum intensity value identified in the window associated with the pixel, whenever it is determined the sharpened intensity value of the pixel under consideration exceeds the maximum intensity value, identifying the intensity in excess of the maximum intensity value, and scaling down the excess intensity by a first prescribed scaling factor to produce a modified intensity value for the pixel under consideration, whenever it is determined the sharpened intensity value of the pixel under consideration does not exceed the maximum intensity value, determining if the sharpened intensity value of the pixel under consideration is less than the minimum intensity value identified in the window associated with the pixel, and if so, identifying the deficit in intensity from the minimum intensity value, and scaling down the intensity deficit by a second prescribed scaling factor to produce a modified intensity value for the pixel under consideration.

14. The process of claim 13, wherein the prescribed group of pixels comprises all the pixel of the image.

15. The process of claim 13, wherein the prescribed group of pixels comprises just the edge pixels of the image.

16. The process of claim 13, wherein the image is a color image and the intensity value of each pixel comprises a combination of the individual intensity of each of a group of color channels, and wherein all the process actions are performed separately on each color channel.

17. The process of claim 13, wherein the size of the prescribed-sized window ranges from about 3×3 pixels to about 9×9 pixels.

18. The process of claim 13, wherein the first prescribed scaling factor is the same as the second prescribed scaling factor for every window.

19. The process of claim 13, wherein the first prescribed scaling factor is different from the second prescribed scaling factor for at least one window.

20. A computer-implemented process for suppressing a halo effect caused by sharpening an image captured with a digital camera, comprising using a computer to perform the following process actions:

for each pixel of the image in a prescribed group of pixels prior to sharpening, identifying the intensity value of each pixel in a prescribed-sized window surrounding the pixel under consideration, and identifying the maximum and minimum intensity values among the pixels in said window;

sharpening the image to establish a sharpened intensity value for each pixel of the image; and for each pixel of the image in the prescribed group of pixels after sharpening, determining if the sharpened intensity value of the pixel under consideration exceeds the maximum intensity value identified in the window associated with the pixel, whenever it is determined the sharpened intensity value of the pixel under consideration exceeds the maximum intensity value, identifying the intensity in excess of the maximum intensity value, and scaling down the excess intensity by a first prescribed scaling factor to produce a modified intensity value for the pixel under consideration, and determining if the modified intensity value of the selected pixel exceed a maximum clipping threshold value, and if so, truncating the pixel's intensity value to match the maximum clipping threshold value, whenever it is determined the sharpened intensity value of the pixel under consideration does not exceed the maximum intensity value, determining if the sharpened intensity value of the pixel under consideration is less than the minimum intensity value identified in the window associated with the pixel, and if so, identifying the deficit in intensity from the minimum intensity value, and scaling down the intensity deficit by a second prescribed scaling factor to produce a modified intensity value for the pixel under consideration, and determining if the modified intensity value of the selected pixel is less than a minimum clipping threshold value, and if so, truncating the pixel's intensity value to match the minimum clipping threshold value.

* * * * *